July 29, 1930.  L. T. ROBINSON  1,771,940
FILM REFERENCE MARKER
Filed April 5, 1927
Fig.1.
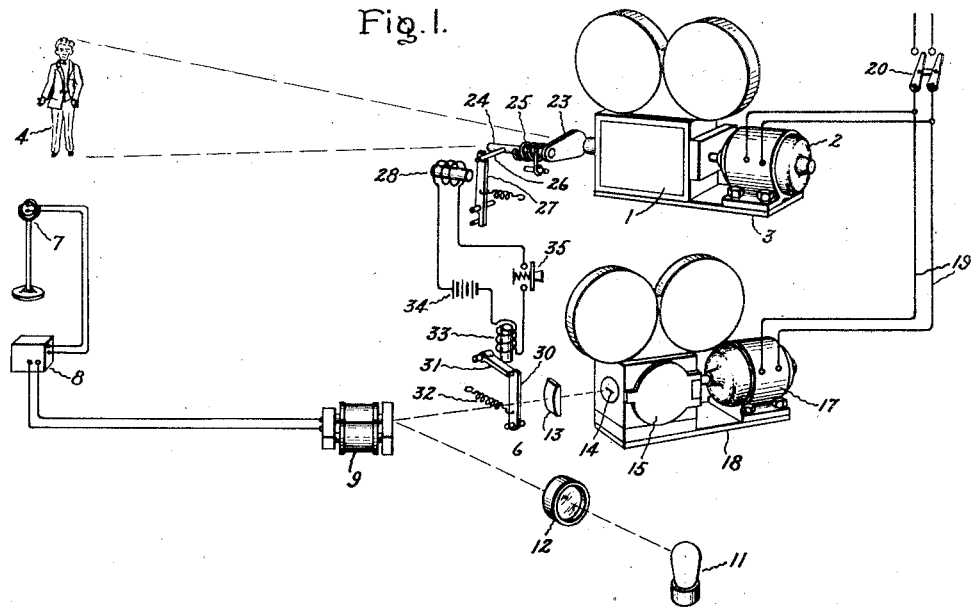
Fig.2.
Fig.3.
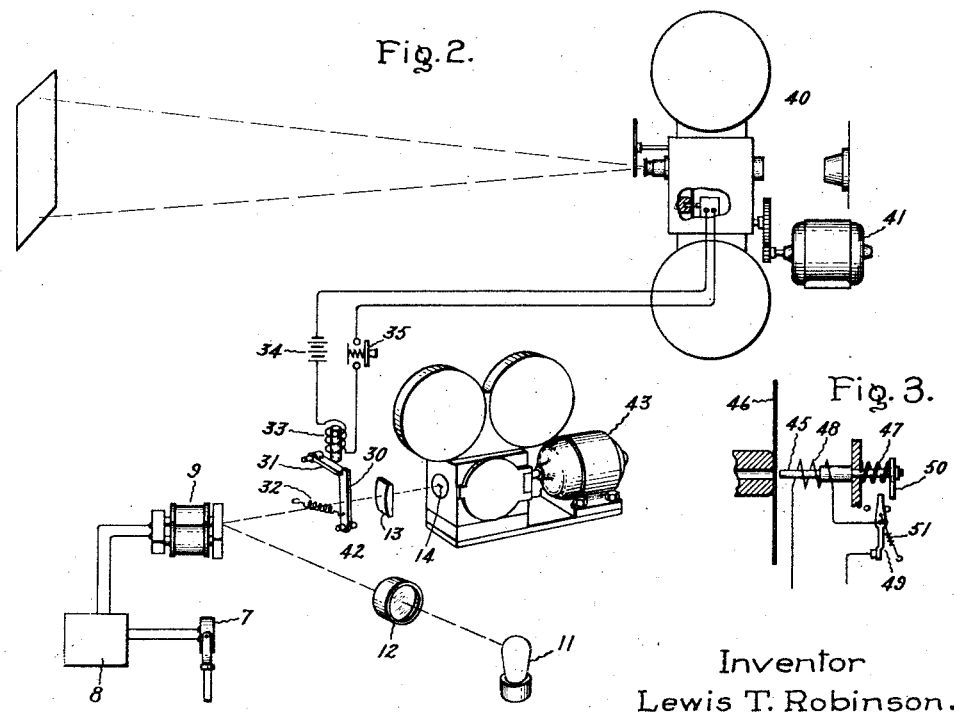
Inventor
Lewis T. Robinson,
by
His Attorney.

Patented July 29, 1930

1,771,940

UNITED STATES PATENT OFFICE

LEWIS T. ROBINSON, OF NISKAYUNA, NEW YORK, ASSIGNOR TO GENERAL ELECTRIC COMPANY, A CORPORATION OF NEW YORK

FILM REFERENCE MARKER

Application filed April 5, 1927. Serial No. 181,182.

My invention relates to sound accompanied motion pictures commonly termed talking motion pictures in which the pictures and the sounds are photographically recorded on separate films from which the respective records thereon subsequently are combined on a single film for reproduction or which films, either themselves or copies thereof, subsequently are passed through separate reproducers simultaneously. An object of my invention is the provision of improved means by which the films bearing the picture and sound records may be properly matched for the printing of a combined film record or may be started in proper relative position through separate picture and sound reproducers.

My invention will be better understood from the following description taken in connection with the accompanying drawing, and its scope will be pointed out in the appended claims.

Referring to the drawing, Fig. 1 shows diagrammatically an embodiment of my invention where the picture and sound records are being made simultaneously; Fig. 2 is similar except that a previously made picture record is projected on a screen when the sound record is made; and Fig. 3 shows a film marker in detail.

In the form illustrated by Fig. 1, I have represented at 1 a motion picture camera, which may be of any well-known type, the mechanism of which is connected to be driven by the synchronous motor 2 shown for convenience of illustration as mounted externally of the camera casing but on the base 3 thereof. The camera is shown arranged to make a moving picture record of the person represented at 4. At 6 I have shown a sound recording device for recording on a moving film the sounds emitted by the person 4, the form of the device being a modification of that disclosed in Letters Patent 1,598,377, Chas. A. Hoxie. In the present case I have shown a microphone or other sound pickup device 7 arranged near the person 4 or source of sound to be recorded and connected through a suitable amplifier 8, such as an electron discharge device, with the oscillograph 9. A light beam from the source 11 modified by a suitable optical system represented by the lenses 12 and 13 is reflected by the mirror of the oscillograph 9 on the narrow light aperture 14 in the front of the recorder casing 15 containing the moving film. For operating the film moving mechanism, I have shown a synchronous motor 17 which for convenience in illustration is shown mounted externally of the casing 15 but on the same base 18. Both motors 2 and 17 preferably are self starting and are connected to the same alternating current circuit 19 controlled by the switch 20. With motors having the same number of poles and with gear reducing mechanism the same in each machine between the film engaging sprockets and the driving motor therefor, the two films will move at the same linear speed. Referring to the camera, I mean by film speed the speed at which the film is withdrawn from one reel and wound on the other.

For projecting the pictures on a screen and for reproducing the recorded sounds from the separate picture and sound record films thus made I may first make a positive print of the picture record in the usual manner and then pass this print and the sound record film respectively through a suitable projector and sound reproducer, the two machines being operated so as to drive the two films at the same linear speed. I may, however, prefer to combine the two records on a single third film in which the picture record may be printed on the body portion of the third or positive film and the sound record printed on a marginal portion thereof. In reproducing, the third film having the combined picture and sound record thereon will be passed through a combined picture projector and sound reproducer. Inasmuch as it is more convenient for mechanical reasons to arrange the projector and the sound reproducer one ahead of the other relative to the length of the film, particularly when employing a projector having an intermittent film moving mechanism, corresponding portions of the picture and sound records must, to produce proper synchronism in the reproduction, be placed one ahead of the other an equal amount. This displacement is easily effected in the printing process, the two original record films having been started with the correct record displacement and being fed through the printer by a sprocket wheel drive will continue throughout their length with the same displacement.

Because of the difficulty, if not inability, of a person to interpret the recorded sounds by an inspection of the sound record it becomes necessary to provide some means of marking the original picture and sound record films so that they may be placed readily in the proper relative position for printing. Also if reproduction is to be made from separate picture and sound record films it is necessary to have the films marked to facilitate their being started in the proper relation. In Fig. 1 I have shown the camera 1 provided with the shutter 23 mounted on shaft 24 and a spring 25 for normally moving the shutter out of alinement with the camera lens. A latch mechanism comprising the rod 26 and the trigger 27 serves to retain the shutter in the position illustrated covering the camera lens. Electromagnet 28 is arranged so that when energized it withdraws the trigger and releases the shutter. A somewhat similar shutter device is shown in connection with the sound recorder 6. Here the shutter 30 is retained in the position illustrated covering the light opening 14 by the trigger 31 against the spring 32 which when the electromagnet 33 is energized withdraws the shutter out of alinement with the light beam entering the opening 14. The two electromagnets are shown connected in series with the battery 34 and the switch 35. With this arrangement the camera and the sound recorder may be started and when both have reached full speed the switch 35 may be closed, thus simultaneously beginning the exposure of the two films and thereby providing a reference mark thereon which may be used as a guide in making a subsequent print combining the records or may be used as a guide in starting separate picture and sound films when such are used in reproducing. If desired, the switch 35 may be operated automatically, as for example when the machines have reached a condition of full speed.

In Fig. 2 I have shown how my invention may be applied to the case where a sound record is being made during the showing of a moving picture, the sounds, such as music or a talk, being associated with the picture. A motion picture projector of well-known construction is shown at 40 connected to be driven by the synchronous motor 41. At 42 I have shown a sound recorder similar in every respect to that shown at 6 in Fig. 1 and also driven by a synchronous motor 43. The recorder 42 is also provided with a shutter 30 and actuating magnet 33 like that shown in Fig. 1 for making a photographic reference mark on the sound film. The picture film already having been exposed and developed cannot be marked photographically. Instead I mark the film mechanically and in Figs. 2 and 3 have shown one way of so marking it. This comprises a small electromagnetically operated punch 45 which is normally retained out of contact with the film 46 by the spring 47 but which is driven against the film when the switch 35 is closed and the coil 48 is energized. To insure the immediate withdrawal of the punch, I have provided the switch 49 in circuit with the coil 48, the switch being moved to open circuit position by being engaged by the arm 50 on the punch and retained by spring 51 being carried over center. Under certain circumstances I may merely cause the punch 45 to make a scratch or a mark on the surface of the film, in fact various expedients may be resorted to for producing a suitable reference mark on the film 46 in response to a closing of the switch 35.

Under certain circumstances I may prefer to drive the picture and sound recording films at speeds which are not the same but have a fixed constant relation with one another. For this purpose I may employ synchronous motors having different numbers of poles or may use similar motors with different gear reductions. Where reproduction is made from separate picture and sound films each film will have driving means similar to that employed in making the record thereon while if the two records are to be printed on a single film for reproduction compensation will be made in the printing process for the difference in length of the two records whereby exact synchronism in the two records at all times will result.

I have chosen the particular embodiment described above as illustrative of my invention and it will be apparent that various modifications may be made without departing from the spirit and scope of my invention, which modifications I aim to cover by the appended claims.

What I claim as new and desire to secure by Letters Patent of the United States is:

1. In combination a moving picture camera and a sound recorder each adapted to have a film upon which the respective picture and sound records are made and each having a light opening through which the respective films are exposed, a shutter for each of said openings biased to a position uncovering the corresponding opening, latches arranged to retain the shutters each in a position covering the respective openings associated therewith, and electromagnetic means for simultaneously operating said latches to cause the simultaneous release of said shutters.

2. In combination a moving picture camera and a sound recorder each adapted to have a film upon which the respective picture and sound records are made and each having a light opening through which the respective films are exposed, a shutter for each of said openings, a spring arranged to move each shutter to a position uncovering the corresponding opening, a latch arranged to retain each shutter in the position covering the opening, an electromagnet for actuating each latch to release the shutter retained thereby, and a common actuating circuit having a switch therein for said electro-magnets.

In witness whereof, I have hereunto set my hand this 4th day of April, 1927.

LEWIS T. ROBINSON.